United States Patent
Chinnappan et al.

(10) Patent No.: US 9,965,803 B2
(45) Date of Patent: *May 8, 2018

(54) FACILITATING BUSINESS TRANSACTIONS BETWEEN TRADING NETWORKS

(71) Applicant: JDA Software Group, Inc., Scottsdale, AZ (US)

(72) Inventors: Mohanasundaram Chinnappan, Nashua, NH (US); Suresh Sridhar, Irving, TX (US); Dasaradh R. Mallampati, Grapevine, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/854,802

(22) Filed: Apr. 1, 2013

(65) Prior Publication Data
US 2013/0332329 A1 Dec. 12, 2013

Related U.S. Application Data

(63) Continuation of application No. 10/080,368, filed on Feb. 21, 2002, now Pat. No. 8,412,581.

(51) Int. Cl.
*G06Q 40/04* (2012.01)
*G06Q 30/06* (2012.01)

(52) U.S. Cl.
CPC ............. *G06Q 40/04* (2013.01); *G06Q 30/06* (2013.01)

(58) Field of Classification Search
CPC ...................................................... G06Q 40/04
See application file for complete search history.

(56) References Cited

U.S. PATENT DOCUMENTS 5,586,261 A * 12/1996 Brooks ................... H04L 45/04
370/401
6,092,196 A * 7/2000 Reiche .................... G06F 21/41
705/52

(Continued)

OTHER PUBLICATIONS

Ludeman, Frank, "Mining's B2B E-Marketplaces—Get Ready," Mining Engineering, 53, Jan. 1, 2001, pp. 23-28.*

(Continued)

*Primary Examiner* — Nathan Erb
(74) *Attorney, Agent, or Firm* — Spencer Fane LLP; Steven J. Laureanti

(57) ABSTRACT

A system is disclosed for establishing an interconnection between trading networks. The system receives an access establishment request communicated from a home user subscribed to a home trading network and not subscribed to a foreign trading network, the access establishment request including a request to access a desired application, the desired application associated with the foreign trading network. The system further communicates the access establishment request to a foreign operator computer system and receives an approval of the access establishment request communicated from the foreign operator computer system. The system still further communicates a home user profile including subscriber information to establish an application access on a home access establishment module and a foreign access establishment module, the application access allowing the home user to use the desired application without subscribing to the foreign trading network, the subscriber information including at least one application associated with the home user profile.

17 Claims, 4 Drawing Sheets

(56) References Cited

U.S. PATENT DOCUMENTS

| | | | |
|---|---|---|---|
| 6,377,982 B1* | 4/2002 | Rai | H04L 12/4633 709/217 |
| 6,393,482 B1* | 5/2002 | Rai | H04L 12/4633 709/217 |
| 6,486,967 B1* | 11/2002 | Hartman | H04N 1/00106 358/1.15 |
| 6,577,643 B1* | 6/2003 | Rai | H04L 12/4633 370/328 |
| 6,618,764 B1* | 9/2003 | Shteyn | H04L 12/2803 709/249 |
| 6,636,894 B1* | 10/2003 | Short | H04L 12/2856 709/225 |
| 6,640,302 B1* | 10/2003 | Subramaniam | G06Q 20/382 709/203 |
| 6,675,208 B1* | 1/2004 | Rai | H04L 12/4633 709/224 |
| 6,708,161 B2 | 3/2004 | Tenorio | |
| 7,231,378 B2* | 6/2007 | Lawson | G06F 21/6218 |
| 7,266,512 B2* | 9/2007 | Cohn | G06Q 30/06 705/26.44 |
| 7,274,933 B2* | 9/2007 | Zinn | H04W 8/183 455/432.1 |
| 7,366,510 B2* | 4/2008 | Gunaratnam | H04W 48/18 455/433 |
| 7,460,868 B2* | 12/2008 | Zinn | H04W 8/183 455/432.1 |
| 7,483,438 B2* | 1/2009 | Serghi | H04L 29/06 370/352 |
| 7,596,375 B2* | 9/2009 | Zinn | H04W 8/183 455/432.1 |
| 8,275,374 B2* | 9/2012 | Zinn | H04W 8/183 455/432.1 |
| 8,412,581 B1* | 4/2013 | Chinnappan | G06Q 40/04 705/26.1 |
| 8,713,641 B1* | 4/2014 | Pagan | G06F 21/44 713/153 |
| 8,789,077 B2* | 7/2014 | Hao | H04N 21/43615 725/110 |
| 8,842,815 B2* | 9/2014 | Connelly | H04L 63/102 379/219 |
| 8,874,729 B2* | 10/2014 | Hu | H04W 4/20 370/230 |
| 8,948,756 B2* | 2/2015 | Zinn | H04W 8/183 455/432.1 |
| 9,098,958 B2* | 8/2015 | Joyce | G06Q 20/00 |
| 9,609,516 B2* | 3/2017 | Golaup | H04W 12/08 |
| 9,654,572 B2* | 5/2017 | Connelly | H04L 67/16 |
| 2002/0002579 A1* | 1/2002 | Holden | G06Q 30/02 709/200 |
| 2002/0111870 A1 | 8/2002 | Chinnappan et al. | |
| 2002/0116637 A1* | 8/2002 | Deitsch | G06F 21/305 726/12 |
| 2002/0133412 A1* | 9/2002 | Oliver | G06Q 30/02 705/26.35 |
| 2002/0147749 A1* | 10/2002 | Ortiz | G06F 17/30905 715/239 |
| 2003/0105864 A1* | 6/2003 | Mulligan | H04L 12/1859 709/225 |
| 2005/0113088 A1* | 5/2005 | Zinn | H04W 8/183 455/435.2 |
| 2007/0298795 A1* | 12/2007 | Zinn | H04W 8/183 455/435.1 |
| 2008/0293379 A1* | 11/2008 | Hinton | H04L 63/0414 455/411 |
| 2009/0023445 A1* | 1/2009 | Zinn | H04W 8/183 455/435.1 |
| 2009/0318148 A1* | 12/2009 | Zinn | H04W 8/183 455/435.2 |
| 2010/0042511 A1* | 2/2010 | Sundaresan | G06Q 10/10 705/26.1 |
| 2011/0026704 A1* | 2/2011 | Connelly | H04L 63/102 379/219 |
| 2011/0154383 A1* | 6/2011 | Hao | H04N 21/43615 725/8 |
| 2013/0031201 A1* | 1/2013 | Kagan | G01D 4/004 709/213 |
| 2015/0074249 A1* | 3/2015 | Connelly | H04L 63/102 709/220 |

OTHER PUBLICATIONS

Ludeman, Frank, "Mining's B2B E-Marketplaces—Get Ready," Miming Engineering, 53, Jan. 1, 2001, pp. 23-28.
Oxford English Dictionary Online, http://dictionary.oed.com, Oxford University Press, 2007.
Kohl, J., Neumann, C.: RFC 1510—The Kerberos Network Authentication Service (V5). Network Working Group. Sep. 1993.
The Internet Society, "Lightweight Directory Access Protocol (v3);" www.cis.ohio-state.edu/cgi-bin/rfc2251.html.
Universal Description, Discovery and Integration, "UDDI Technical White Paper" www.uddi.org/pubs/lru_UDDI_Technical_White_Paper.pdf.
Pend. Pat. App. Chinnappan et al., "System and Method for Facilitating Electronic Commerce Transactions," U.S. Appl. No. 60/235,945.
Eric Christensen, Francisco Cubera, Greg Meredith, and Sanjiva Weerawarana, "Web Services Description Language (WSDL);" www.w3org/TR/wsdl.
Francisco Cubera, David Ehnebuske, and Dan Rogers, "Using WSDL in a UDDI Registry 1.05, UDDI Working Draft Best Practices Document," www.uddi.org/pubs/wsdlbestpractices-V1.05-Open-20010625.pdf.
Martin Gudgin, Marc Hadley, Jean-Jacques Moreau, and Henrik Frystyk Nielsen, "SOAP Version 1.2, W3C Working Draft," www.w3.org/TR/2001/WD-soap12/20010709/.
Pend. Pat. App. Mallampati et al., "Information Exchange in an Electronic Trading Network," U.S. Appl. No. 09/944,735.
Tom Kaneshige, "Elemica, Quadrem Link e-Markets," www.line56.com/articles/print/default.asp?newsID=3385.

* cited by examiner

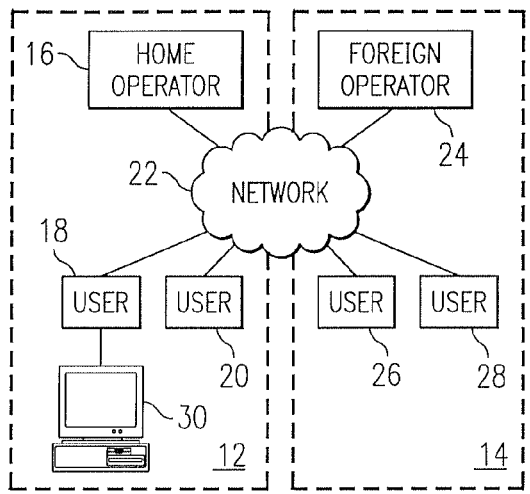
FIG. 1
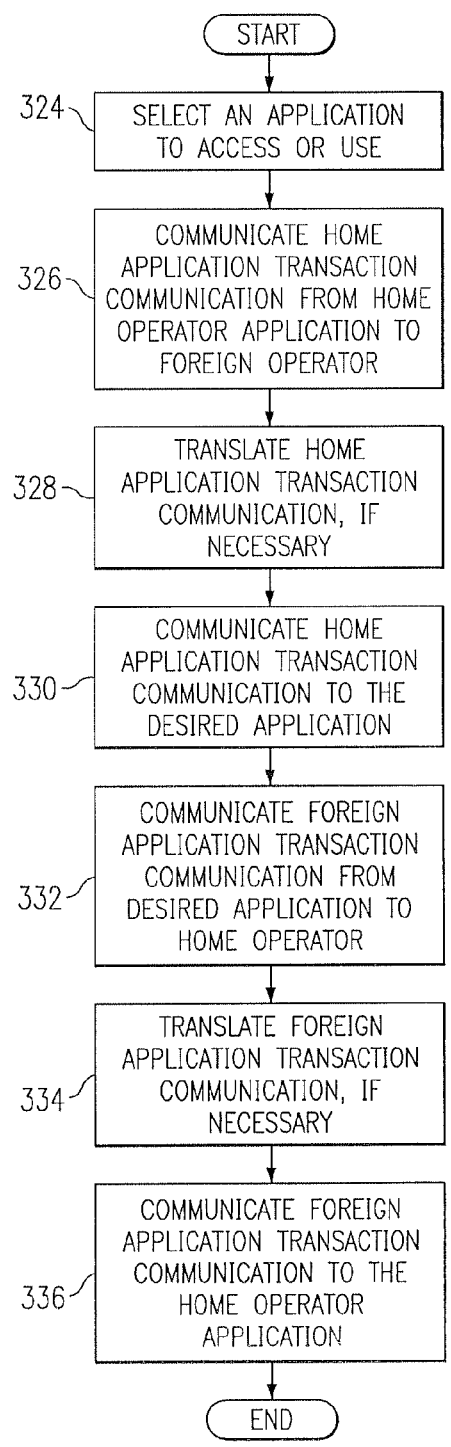
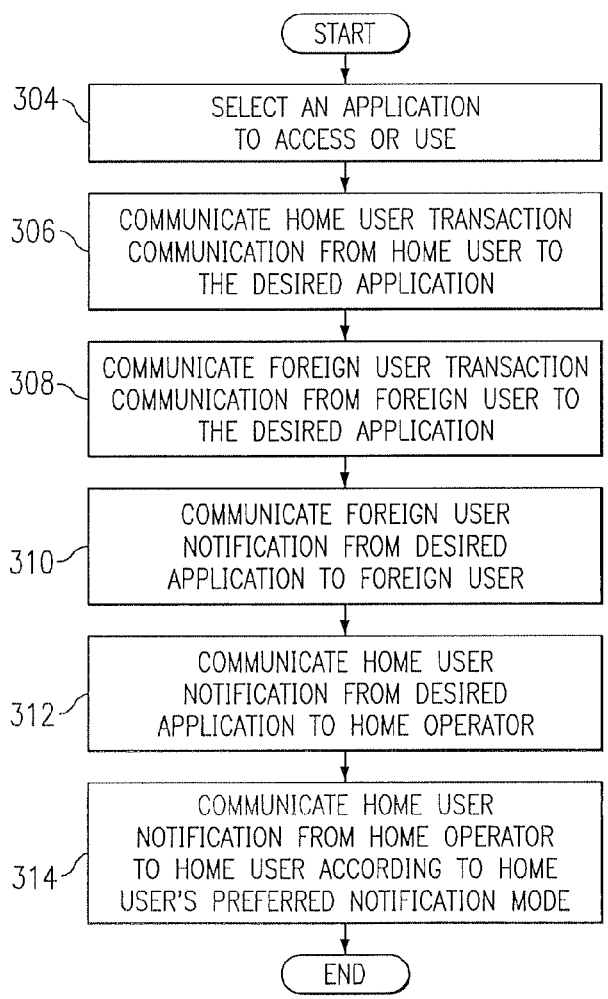

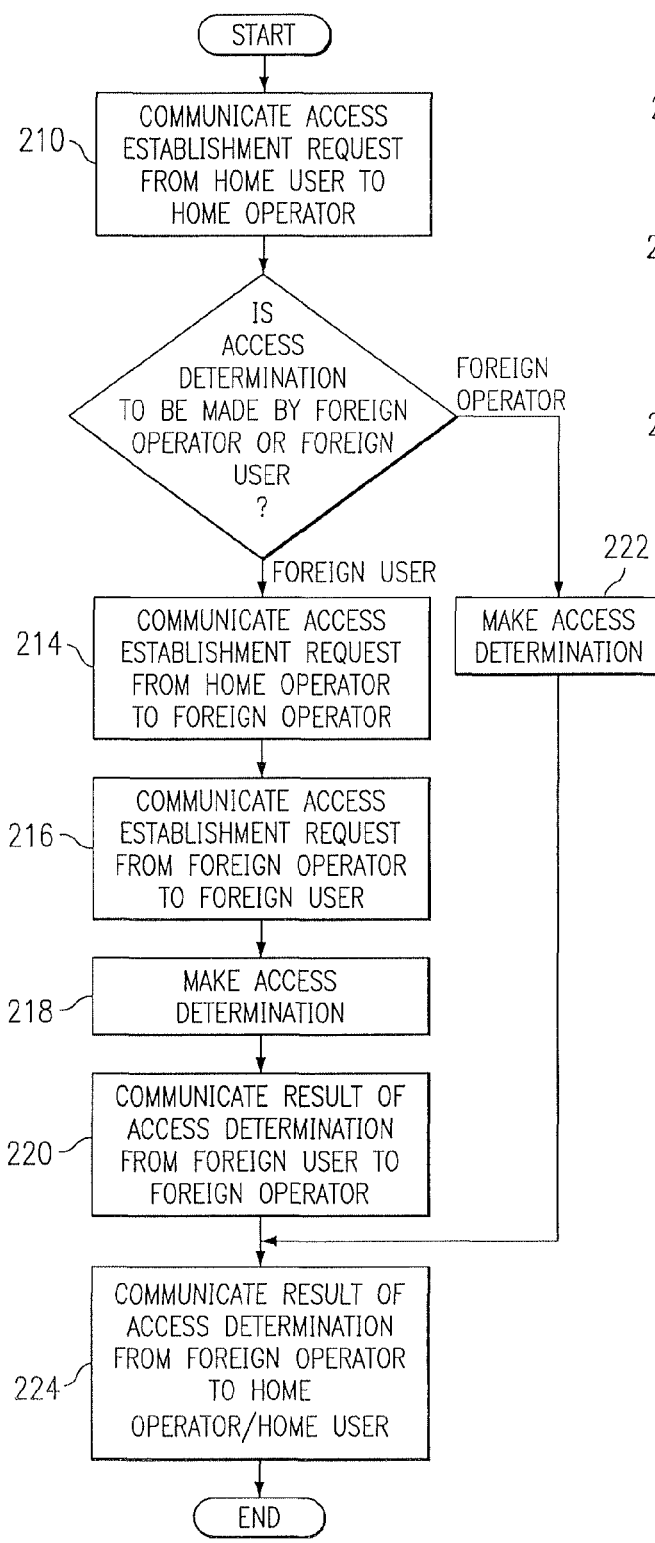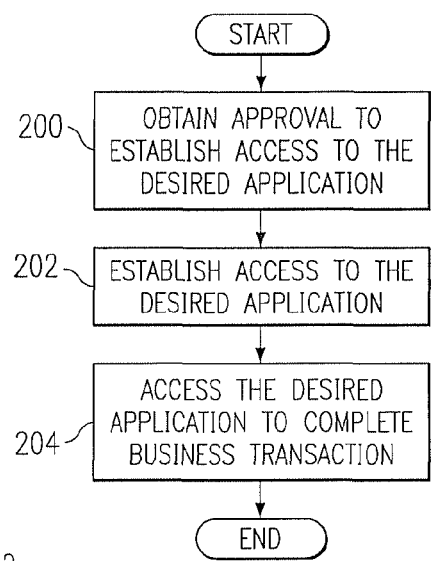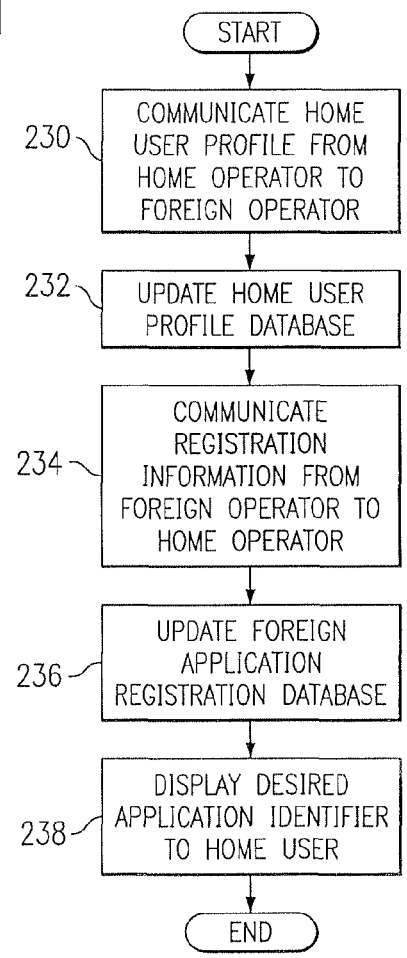

FACILITATING BUSINESS TRANSACTIONS BETWEEN TRADING NETWORKS

CROSS-REFERENCE TO RELATED APPLICATIONS

This application is a continuation of U.S. patent application Ser. No. 10/080,368 filed on Feb. 21, 2002 and entitled "FACILITATING BUSINESS TRANSACTIONS BETWEEN TRADING NETWORKS." U.S. patent application Ser. No. 10/080,368 is assigned to the assignee of the present application. The disclosed of related U.S. patent application Ser. No. 10/080,368 is hereby incorporated by reference into the present disclosure as if fully set forth herein.

TECHNICAL FIELD OF THE INVENTION

This invention relates to the field of computerized business transactions, and more particularly to facilitating business transactions between trading networks.

BACKGROUND OF THE INVENTION

As the commercial significance of the Internet increases, business-to-consumer ("B2C"), business-to-business ("B2B"), and other electronic trading networks have become increasingly more prevalent. Each electronic trading network typically involves a set of users or trading partners (such as, for example, individuals, organizations, businesses, or e-marketplaces) that communicate among themselves in order to complete business transactions. In a typical electronic trading network, business transactions are restricted to users or trading partners who are subscribed to that network. If a particular user wishes to perform business transactions with users subscribed to different trading networks, the user must typically subscribe to and maintain log-in information for each of those trading networks.

SUMMARY OF THE INVENTION

According to the present invention, disadvantages and problems associated with previous systems and methods for facilitating business transactions using e-marketplaces have been substantially reduced or eliminated.

According to one embodiment of the present invention, a method of establishing an interconnection between trading networks includes receiving at a home operator of a home trading network an access establishment request communicated from a home user. The access establishment request includes a request to establish access to a desired application. The desired application is associated with a foreign trading network coupled to the home trading network via a computer network. The method further includes communicating the access establishment request from the home operator to a foreign operator of the foreign trading network. In addition, the method further includes receiving at the home operator an approval of the access establishment request communicated from the foreign operator, if appropriate, and establishing an application access allowing the home user to use the desired application. Furthermore, the method includes communicating a transaction communication to the desired application. The transaction communication relates to a business transaction.

According to another embodiment, a method of establishing an interconnection between trading networks includes receiving at a foreign operator of a foreign trading network an access establishment request communicated from a home operator of a home trading network. The home trading network is coupled to the foreign trading network via a computer network. The access establishment request is initiated by a home user associated with the home trading network and includes a request to establish access to a desired application associated with the foreign trading network. The method further includes communicating an approval of the access establishment request to the home operator, if appropriate, and establishing an application access allowing the home user to use the desired application. The method further includes receiving at the foreign operator a transaction communication communicated from the home trading network. The transaction communication relates to a business transaction.

Various embodiments of the present invention may benefit from numerous technical advantages. It should be noted that one or more embodiments may benefit from some, none, or all of the advantages discussed below.

One technical advantage is that a user subscribed to one trading network can access and/or use applications of other trading networks that may not otherwise be available to the user. In particular, the user can access and/or use applications of other trading networks without having to subscribe to or maintain sign-on or login information for each of these other trading networks. In addition, users may obtain extended reach and access to subscribed users and applications of other trading networks. This may strengthen the relationship between the operator and its subscribed users, and increase the attractiveness for potential subscribers to join the trading network. These advantages may result in increased revenues to the operator of the trading network.

In addition, a particular user's home operator (in other words, the operator of the trading network to which the user is subscribed) may provide a "one-stop shop" providing the user with seamless access to applications of many trading networks. Furthermore, the unit cost for each user may be reduced due to the shared use of underlying infrastructure associated with some embodiments of the present invention.

Another technical advantage is that communications sent from and received by users may appear seamless and transparent. In other words, the user may be unaware of the detailed operations of operators that enable and facilitate the communications. In addition, the user need not obtain or maintain the location or address information for other users or operators; instead, an operator may maintain this location or address information and manage the appropriate routing of communications accordingly. Moreover, obtaining approval for and establishing access to an application may be seamless and transparent to the user wishing to access the application.

Other important technical advantages are readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example trading network system;

FIG. 3 illustrates an example method for establishing an interconnection between trading networks;

FIG. 4 illustrates an example method for obtaining an approval to establish access to a desired application of a trading network;

FIG. 5 illustrates an example method of establishing access to a desired application;

FIG. 7 illustrates another example method of interaction between a home trading network and a foreign trading network; and FIG. 8 illustrates yet another example method of interaction between a home trading network and a foreign trading network.

DETAILED DESCRIPTION OF THE INVENTION

Figure 2:
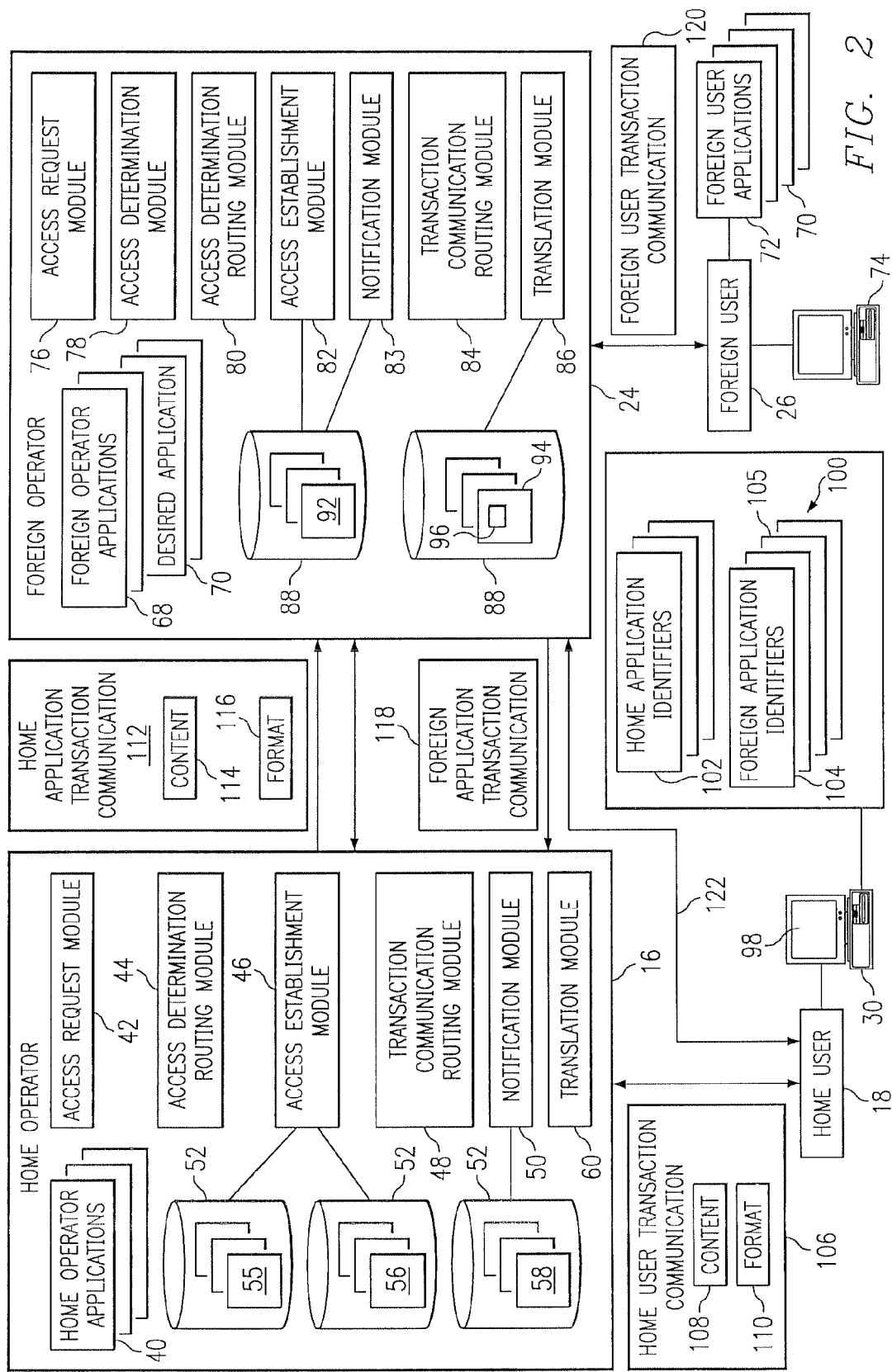
FIG. 2 illustrates an example structure and operation of a home operator and a foreign operator of a trading network system.

FIG. 1 illustrates an example trading network system 10. Trading network system 10 includes a plurality of electronic trading networks, such as a home trading network 12 and a foreign trading network 14. Trading networks 12 and 14 allow a set of trading partners or users to communicate among themselves in order to complete business transactions. Trading networks 12 and 14 may be business-to-consumer ("B2C"), business-to-business ("B2B"), or any other type of electronic trading network. Trading networks 12 and 14 may include public or private electronic marketplaces, trading exchanges, trading clearinghouses, or any other trading entity that facilitates commerce between two or more trading partners or users. As an example only, in particular embodiments trading networks 12 and/or 14 may be separate instances of TradeMatrix Open Commerce Network (OCN), provided by i2 Technologies, Inc.

Home trading network 12 includes a home operator 16 and one or more trading partners or users, such as home users 18 and 20, that are coupled to home operator 16 by a network 22. Similarly, foreign trading network 14 includes a foreign operator 24 and one or more trading partners or users, such as foreign users 26 and 28, that are coupled to foreign operator 24 by network 22. Home users 18 and 20 and foreign users 26 and 28 may be individuals, organizations, businesses, e-marketplaces, or any other entity suitable to participate in an electronic trading network. Home trading network 12 allows subscribed users, such as home users 18 and 20 to communicate among themselves in order to complete business transactions.

Home users 18 and 20, as well as home operator 16, may each operate on one or more computer systems, such as a computer system 30, at one or more locations and may share data storage, communications, or other resources according to particular needs. Computer system 30 may include appropriate input devices, output devices, mass storage media, processors, memory, or other components for receiving, processing, storing, and communicating information according to the operation of home trading network 12. Similarly, foreign users 26 and 28, as well as foreign operator 24, may operate on one or more computer systems, such as a computer system similar to computer system 30. As used in this document, the term "computer" is intended to encompass a personal computer, work station, network computer, wireless data port, wireless telephone, personal digital assistance, one or more microprocessors within these or other devices, or any other suitable processing device.

Network 22 may include one or more local area networks (LANs), metropolitan area networks (MANS), wide area networks (WANs), a global computer network such as the Internet, and/or any other appropriate wire line, wireless, or other communication links. The users and operator of each electronic trading network (such as home users 18 and 20 and home operator 16 of home trading network 12, and foreign users 26 and 28 and foreign operator 24 of foreign trading network 14) may communicate with one another according to a hub-and-spoke, peer-to-peer, or other suitable architecture.

Home users 18 and 20 may be subscribed to home trading network 12 in order to have access to application or services provided by, and/or to participate in transactions with other subscribed users of, home trading network 12. Similarly, foreign users 26 and 28 may be subscribed to foreign trading network 14 to access applications or services provided by foreign trading network 14, and/or to participate in transactions with other subscribed users of foreign trading network 14. In addition, home users 18 and 20 and foreign users 26 and 28 may maintain login, or sign-on, information used to access, or login to, home trading network 12 and foreign trading network 14, respectively.

In addition, as described in greater detail below with reference to FIGS. 2 through 8, home users 18 and/or 20 may obtain access to interact with foreign trading network 14 without having to subscribe to, or maintain login or sign-on information regarding, foreign trading network 14. For example, home users 18 and/or 20 may obtain access to use applications or services provided by foreign trading network 14, and/or to communicate or participate in transactions with other subscribed users of foreign trading network 14. Thus, trading network system 10 may eliminate the need for particular users to join or subscribe to each trading network with which the user would like to interact.

It should be noted that the terms "home" and "foreign" as used in this document are merely illustrative to provide a perspective for particular embodiments. In particular, in this document, the term "home" is generally used to refer to the user (as well as that user's associated operator and trading network) attempting to establish access to an application associated with another trading network, and the term "foreign" is generally used to refer to the trading network (as well as the operator and users of that trading network) with which the application is associated. A particular trading network may operate as both a home trading network (when a user subscribed to the particular trading network attempts to access an application associated with another trading network) and a foreign trading network (when a user subscribed to another trading network attempts to access an application associated with the particular trading network). Thus, in some embodiments, home trading network 12 may serve as a foreign trading network when a user or users from another trading network wish to access an application associated with home trading network 12. In a particular embodiment in which foreign user 26 or 28 wishes to access an application associated with trading network 12 (and thus user 26 or 28 is the home user), trading network 14 serves as the home trading network and trading network 12 serves as the foreign trading network FIG. 2 illustrates an example structure and operation of home operator 16 and foreign operator 24. In particular, FIG. 2 illustrates how home operator 16 foreign operator 24 may be used to facilitate transactions between home user 18 (or home operator 16) and foreign user 26 (or foreign operator 24). It should be noted that although network 22 is not expressly shown in FIG. 2, communications among home user 18, home operator 16, foreign user 26, and foreign operator 24, may be communicated via network 22. Thus, the arrows between home user 18, home operator 16, foreign user 26, and foreign operator 24 are shown only to illustrate the potential paths of communications between these entities. For example, the arrow between home user 18 and foreign operator 24 (discussed below as arrow 122) is used to show that a particular communication may be communicated via network 22 from home user 18 to foreign operator 24 without passing through the other entities (in other words, home operator 16 and foreign user 26) shown in FIG. 2.

Home operator 16 may include one or more home operator applications 40 that provide services to users subscribed to home trading network 12, such as home user 18. For example, home operator applications 40 may include one or more connectivity applications, for example e-mail applications, allowing users to communicate with each other. Home operator applications 40 may also include one or more business transaction engines, such as, for example, a product or service transaction engine, a supply chain planning engine, an enterprise collaboration engine, and a demand fulfillment engine. In addition, home operator applications 40 may include one or more business or transaction management applications, such as, for example, a service subscription and management application, a user administration application, a transaction management application, an order management application, an inventory management application, a catalog application, or an application (such as a service explorer) for looking up and/or discovering available applications. Home operator applications 40 may also include one or more horizontal services such as, for example, shipping services, payment services, insurance services, or any other appropriate horizontal services, and/or one or more vertical services such as, for example, direct procurement services, indirect procurement services, catalog services, available-to-promise (ATP) services, or any other appropriate vertical services. Further, home operator applications 40 may include one or more security services used to provide secure and authentic business transactions with users over the Internet or other communications link such as, for example, authentication services, authorization services, encryption services, or any other appropriate security services.

It should be understood that home operator applications 40 may also include any other appropriate application or service that might be provided by a trading network without departing from the scope of present invention. By providing access to such home operator applications 40, home operator 16 serves as a central point through which users subscribed to home trading network 12, such as home user 18, can exchange information, conduct transactions, and collaborate with other entities.

Home operator 16 may also include one or more modules for facilitating interaction between home user 18 and foreign trading network 14, including an access request module 42, an access determination routing module 44, an access establishment module 46, a transaction communication routing module 48, a notification module 50, and a translation module 60. In particular, these modules facilitate the access or use of one or more applications of foreign trading network 14 by home user 18 if such access or use is approved by foreign operator 24 or foreign user 26, as described below in greater detail.

Home operator 16 may also include one or more data storage locations 52 that include variety information. For example, the data storage locations 52 may include home user profiles 55 that include information regarding subscribed users of trading network 12, such as home user 18. Home user profiles 55 may include information such as a routing address or other contact information, a list of associated applications, preferred communication protocols, preferred data formats, or other information regarding each subscribed user. The data storage locations 52 may also include registration information 56 corresponding with one or more applications hosted by foreign trading networks, such as foreign trading network 14. In particular, registration information 56 may correspond with applications for which access has been established by one or more users subscribed to home trading network 12, such as users 18 and 20. In addition, the data storage locations 52 may include home user notification data 58 corresponding to one or more users subscribed to home trading network 12, such as home users 18 and 20. Home user notification data 58 for a particular user may include that user's preferred mode of notification (for example, by email) for receiving particular notifications.

Similar to home operator 16, foreign operator 24 may include one or more foreign operator applications 68 that provide services to users subscribed to foreign trading network 14, such as foreign user 26. For example, foreign operator applications 68 may include any application suitable to be provided by an electronic trading network, including any application or service listed above with reference to home operator applications 40. By providing access to such foreign operator applications 68, foreign operator 24 serves as a central point through which users subscribed to foreign trading network 14, such as foreign user 26, can exchange information, conduct transactions, and collaborate with other entities.

Foreign operator applications 68 may include a desired application 70, which represents, for purposes of example, an application that home user 18 wishes to access or use. Alternatively, and not expressly shown in FIG. 2, desired application 70 may be associated with a foreign trading network other than foreign trading network 14, but accessible to foreign operator 24. In either of these two alternatives in which desired application 70 is accessible by foreign operator 24, desired application 70 may be said to be hosted by foreign operator 24. Alternatively, desired application 70 may be hosted by foreign user 26 as one a set of one or more foreign user applications 72. In one embodiment, foreign user applications 72, including desired application 70, may be stored in a computer system 74 associated with foreign user 26, such as a computer system similar to computer system 30 discussed above with reference to FIG. 1.

Foreign operator 24 may also include one or more modules for facilitating interaction between home user 18 and foreign trading network 14, including an access request module 76, an access determination module 78, an access determination routing module 80, an access establishment module 82, a notification module 83, a transaction communication routing module 84, and a translation module 86. In particular, these modules facilitate the access or use of one or more desired applications 70 by home user 18 if such access or use is approved by foreign operator 24 or foreign user 26, as described below in greater detail.

In addition, foreign operator 24 may include one or more data storage locations 88 that may also include one or more foreign user profiles 94 similar to home user profiles 55, each foreign user profile 94 corresponding with a user subscribed to foreign trading network 14, such as foreign users 26 and 28. The data storage locations 88 may also include one or more home user security profiles 92, each corresponding with a user subscribed to home trading network 12, such as home user 18 or 20. The home user security profile 92 associated with a particular home user may include only a subset of the information in that user's home user profile 55 stored in data locations 52 associated with home operator 16, as discussed above. For example, home user security profile 92 associated with home user 18 may include only the address of home operator 16 and that home user 18 is subscribed to home trading network 12. Thus, other information regarding home user 18 which is not essential for locating and communicating with home user 18 may be kept private and/or secure.

Foreign user profiles 94 may include one or more preferred communication protocols (for example, HTTP, HTTPS, SMTP, or VAN) for sending information to and/or receiving information from an operator, such as foreign operator 24. The term "communication protocol" refers to a transport mechanism for communicating information via network 22. Foreign user profiles 94 may also include one or more preferred data formats 96, each preferred data format 96 including a preferred format for communications received by a particular foreign operator application 68 or foreign user application 72. Preferred data formats 96 may include, for example, communication formats such as EDI, XML with well-defined schema, and file formats (such as structured text or binary files), or any other format suitable for communicating electronic data. Preferred data formats 96 may also include details of particular communication formats, such as the standard (for example, ANSI X12 for EDI), type (for example, EDI 850 for a purchase order), and version (for example, EDI 4010).

As discussed above, home user 18 may operate on one or more computer systems, such as a computer system 30. Computer system 30 may include a display 98 accessible to home user 30. Display 98 may be operable to display one or more application identifiers 100, each representing or identifying an application available to be accessed and/or used by home user 18. Each application identifier 100 may be an icon, link (for example, hyperlinks), shortcut, or any other suitable representation or identification of an application. Application identifiers 100 may also include representations or identifiers of particular users with which home user 18 may communicate using an available connectivity application.

Application identifiers 100 may include one or more home application identifiers 102 identifying one or more available home applications, and one or more foreign application identifiers 104 identifying one or more available foreign applications. Home application identifiers 102 include representations or identifiers of one or more home operator applications 40, one or more applications hosted by home user 18 (such as for example applications stored by computer system 30), and/or one or more applications otherwise associated with home trading network 12. Foreign application identifiers 104 include representations or identifiers of one or more applications associated with foreign trading networks (in other words, trading networks other than home trading networks 12), such as foreign operator applications 68 or foreign user applications 72 associated with foreign trading network 14. Moreover, if access to desired application 70 is established as discussed below, foreign application identifiers 104 may include desired application identifier 105 associated with desired application 70.

Home application identifiers 102 may be distinguished from foreign application identifiers 104 in display 98, for example by different color-coding or using different fonts or sizes. In one embodiment, display 98 includes a "dashboard" included in an interface that user 18 uses to access home operator 16. The dashboard may display one or more application identifiers 100 in a pre-determined order or format. For example, the dashboard may include a listing or table of one or more application identifiers 100, including for each application, that application's name, provider (for example, the foreign trading network or foreign user by which the application is hosted), and/or description.

As discussed above, the modules of home operator 16 and foreign operator 24 may facilitate the access or use of desired application 70 by home user 18 if such access or use is approved by foreign operator 24 or foreign user 26. In the illustrated embodiment, these example modules operate as follows. It should be understood, however, that the functions described below may be performed by any appropriate number and combination of functional modules. Access request module 42 of home operator 16 may be operable to receive an access establishment request communicated from home user 18 and communicate the access establishment request to foreign operator 24. The access establishment request may include a request to establish access to desired application 70. For example, in an embodiment in which home user 18 wishes to communicate with foreign user 26, the access establishment request includes a request to establish access to a connectivity application hosted by foreign operator 24 or foreign user 26. In this embodiment, home user 18 is allowed to communicate with foreign user 26 using the connectivity application if the access establishment request is approved.

In the illustrated embodiment, access request module 76 of foreign operator 24 is operable to receive the access establishment request communicated from access request module 42 of home operator 16. Once received, an access determination of whether to approve or deny the access establishment request is made. The access determination may be made using any appropriate criteria, for example, the industry or the size of the entity requesting access; the business impact of approving access in terms of estimated costs and revenues, market share, or other financial measure; technical criteria such as performance and quality of service; the number of users already having access to desired application 70; the type or time or access to desired application 70; service level agreements; or ally mutual agreeable criteria. The access determination may be made by access determination module 78 of foreign operator 24 in certain circumstances. In other circumstances, the access determination is made by foreign user 26. If the access determination is made by foreign user 26, access determination routing module 80 of foreign operator 24 communicates the access establishment request to foreign user 26 so that foreign user 26 may make the access determination. In this situation, access determination routing module 80 also receives the access determination made by foreign user 26.

Whether the access determination is made by foreign operator 24 or foreign user 26, access determination routing module 80 is further operable to communicate the results of the access determination, such as an approval or denial, to home operator 16.

Access determination routing module 44 of home operator 16 is operable to receive the results of the access determination, such as an approval or denial, communicated from access determination routing module 80 of foreign operator 24. Access determination routing module 44 is further operable to communicate the results of the access determination to home user 18, for example by email or other suitable mode of notification.

Access establishment module 46 of home operator 16 and access establishment module 82 of foreign operator 24 are operable to establish an application access allowing home user 18 to use desired application 70. In particular, access establishment modules 46 and 82 establish the application access if the result of the access determination made by foreign operator 24 or foreign user 26 is an approval.

Access establishment module 46 of home operator 16 is operable to communicate home user profile 55 or a home user security profile 92 associated with home user 18 to foreign operator 24. In some embodiments, home user security profile 92 includes only a subset of the information stored in home user profile 55 regarding home user 18, as discussed above. This may help maintain the privacy and/or security of certain information regarding home user 18. Access establishment module 46 may also be operable to communicate changes or updates in home user security profile 92 to foreign operator 24.

Access establishment module 82 of foreign operator 24 is operable to receive home user profile 55 or home user security profile 92 communicated from access establishment module 46 of home operator 16. Access establishment module 82 may be further operable to update home user profile database 88 based on received home user profile 55 or home user security profile 92 or received changes or updates in home user profile 55 or home user security profile 92. For example, access establishment module 82 may add home user security profile 92 to home user profile database 88 or update home user security profile 92 stored in home user profile database 88 based on changes or updates received from access establishment module 46.

Access establishment module 82 is further operable to communicate registration information 56 associated with desired application 70 to home operator 16. Registration information 56 may include information regarding desired application 70 such that access to desired application 70 may be displayed to home user 18. Access establishment module 82 may also be operable to communicate changes or updates in registration information 56 to foreign operator 24.

Access establishment module 46 of home operator 16 is operable to receive registration information 56 communicated from access establishment module 82 of foreign operator 24. Access establishment module 46 may be further operable to update the contents of at least one data storage location 52 based on received registration information 56 or changes or updates in registration information 56. For example, access establishment module 46 may add registration information 56 to a data storage location 52 or update registration information 56 stored at a data storage location 52 based on changes or updates received from access establishment module 82.

Access establishment module 46 may be further operable to update display 98 based on the received registration information 56. In one embodiment, access establishment module 46 may create or facilitate the creation of desired application identifier 105 corresponding to desired application 70 such that desired application identifier 105 may be displayed by display 98 (for example, in a dashboard). Home user 18 may select any application identifier 100, including desired application identifier 105, displayed in display 98 in order to access or use that application.

In some embodiments of the present invention, obtaining approval of the access establishment request after making the request, and/or establishing the application access, are transparent to home user 18. In particular, after home user 18 makes the access establishment request, the approval and access establishment, including displaying desired application identifier 105 in display 98, may be completed by the operators 16 and 24 without any further action taken by home user 18. Thus, the approval and access establishment may be said to be seamless and transparent to home user 18 in such embodiments.

Transaction communication routing module 48 of home operator 16 is operable to communicate a home user transaction communication 106 to desired application 70 if the application access is established by access establishment modules 46 and 82. Home user transaction communication 106 relates to a business transaction, and may include a transaction content 108 and a transaction format 110. Transaction content 108 may include the substantive content of the home user transaction communication 106 (for example, the contents of a purchase order), and transaction format 110 may include the format (for example, XML) of transaction content 108 (although transaction format 110 may not be included in many situations). Home user transaction communication 106 may include a document, a data file, a multimedia file (for example, including image, audio, and/or video data), a time-sensitive signal or alert, or a high-priority message such as an interrupt. Home user transaction communication 106 may also include a Uniform Resource Identifier (URI) of a particular operator to help transaction communication routing module 48, the credentials of home user 18 or home operator 16, and any required transaction parameters and values (for example, in name-value pair notation). Further, home user transaction communication 106 may also include a communication intended for foreign user 26 or desired application 70 via a connectivity application, such as an email, or any type of communication able to be communicated via a computer network.

Transaction communication routing module 48 is also operable to communicate a home application transaction communication 112 from a home operator application 40 to desired application 70. Home application transaction communication 112 relates to a business transaction, and may include a transaction content 114 and a transaction format 116. Transaction content 114 may include the substantive content of the home application transaction communication 112, and transaction format 116 may include the format of transaction content 114 (although transaction format 116 may not be included in many situations). Like home user transaction communication 106, home application transaction communication 112 may include any of the communications listed above with reference to home user transaction communication 106.

In particular circumstances, home user transaction communication 106 or home application transaction communication 112 may be translated by translation module 60 of home operator 16 before being communicated to foreign operator 24. This may be useful, for example, if foreign operator 24 does not include translation module 86 or if translation module 86 of foreign operator 24 is not capable of translating home user transaction communication 106 or home application transaction communication 112.

Translation module 60 is operable to receive home user transaction communication 106 from transaction communication routing module 48, to determine whether to translate home user transaction communication 106, and to translate home user transaction communication 106, if appropriate. Translation module 60 may determine whether to translate transaction content 108 of home user transaction communication 106 based on a comparison of transaction format 110 and the preferred data format 96 for desired application 70 stored in the foreign user profile 94 associated with foreign user 26.

Translation module 60 may be further operable to determine problems associated with translating home user transaction communication 106 and to communicate the problems to home user 18. Home operator 16 may communicate the problems received from translation module 60 to home user 18 using any suitable mode of notification (for example, email) such that home user 18 may appropriately re-format and re-send home user transaction communication 106.

Similarly, translation module 60 may be operable to receive home application transaction communication 112 from transaction communication routing module 48, determine whether to translate home application transaction communication 112, translate home application transaction communication 112 if appropriate, and determine and communication translation problems associated with translating home application transaction communication 112.

Transaction communication routing module 84 of foreign operator 24 is operable to receive home user transaction communication 106 and to communicate home user transaction communication 106 to desired application 70 or translation module 86. In some circumstances in which home user transaction communication 106 is not translated by translation module 86, transaction communication routing module 84 may communicate home user transaction communication 106 to desired application 70 without communicating home user transaction communication 106 to translation module 86. In other circumstances in which home user transaction communication 106 is translated by translation module 86, transaction communication module 84 may communicate the translated home user transaction communication 106 to desired application 70.

In particular circumstances, transaction communication routing module 84 receives home user transaction communication 106 from home user 18 without the home user transaction communication 106 being communicated to or from home operator 16, such as indicated by the path of arrow 122. For example, transaction communication routing module 84 may receive home user transaction communication 106 communicated from home user 18 using a web browser.

Transaction communication routing module 84 is also operable to receive home application transaction communication 112 from one or more home operator applications 40 associated with home operator 16. For example, transaction communication routing module 84 may receive data files or documents from one or more home operator applications 40. Similarly, transaction communication routing module 48 is operable to receive a foreign application transaction communication 118 from one or more foreign operator applications 68 or foreign user application 72.

In addition, transaction communication routing module 84 is also operable to receive a foreign application transaction communication 120 from foreign user 26, and to communicate foreign application transaction communication 120 to desired application 70. Foreign user transaction communication 120 may relate to the same business transaction as user transaction communication 106, and may be made in response to home user transaction communication 106 initiated by home user 18. In some situations, home user transaction communication 106 and foreign user transaction communication 120 form at least a portion of a business transaction.

Translation module 86 is operable to receive home user transaction communication 106 from transaction communication routing module 84, to determine whether to translate home user transaction communication 106, and to translate home user transaction communication 106, if appropriate. Like translation module 60 of home operator 16, translation module 86 may determine whether to translate transaction content 108 of home user transaction communication 106 based on a comparison of transaction format 110 and the preferred data format 96 for desired application 70 stored in the foreign user profile 94 associated with foreign user 26.

Like translation module 60, translation module 86 may be further operable to determine problems associated with translating home user transaction communication 106 and to communicate the problems to home operator 16 and/or foreign user 26. In addition, translation module 86 may be operable to receive home application transaction communication 112 from transaction communication routing module 84, determine whether to translate home application transaction communication 112, translate home application transaction communication 112 if appropriate, and determine and communicate translation problems associated with translating home application transaction communication 112.

In certain circumstances, desired application 70 may be used collaboratively by home user 18 and foreign user 26 to complete at least a portion of a business transaction. For example, home user 18 may communicate a document to desired application 70, and foreign user 26 may make changes to the document using desired application 70. As another example, in an embodiment in which desired application 70 is a web-based application, home user 18 and foreign user 26 may collaboratively use desired application 70 by communicating information to the application using one or more web browsers.

In certain circumstances in which desired application 70 is used collaboratively by home user 18 and foreign user 26, desired application 70 may communicate a foreign user notification to foreign user 26 and a home user notification intended for home user 18 to home operator 16. For example, in one embodiment, when a business transaction involves both home user 18 and foreign user 26 interacting with desired application 70, actions taken by either user 18 or 26 and/or changes in the status of the transaction are communicated to users 18 or 26 via notifications. For example, an action taken by either user 18 or 26 outside of a predetermined time window for the action may trigger a notification. Notifications may also be generated in such circumstances as, for example, an inventory stock-out, a mismatch between a forecast and a committed quantity of goods, a shipment delay, or an order cancellation.

Notification module 50 is operable to receive the home user notification from desired application 70 and communicate the home user notification to home user 18. In one embodiment, home user notification data 58 includes a preferred notification mode (for example, email) associated with home user 18, and notification module 50 is operable to communicate the home user notification to home user 18 using the preferred notification mode. Alternatively, notification module 83 of foreign operator 24 may notify home user 18 directly using notification information stored in home user profile 55 or home user profile 92 associated with home user 18.

Thus, the various modules and other example components discussed above may provide a number of advantages to users subscribed to electronic trading networks. For example, users subscribed to one trading network (for example, user 18 subscribed to home trading network 12) can request access to applications associated with other trading networks (for example, desired application 70 of foreign trading network 14). In particular, a user may be able to request access to an application which is not hosted by the operator of that user's trading network. For example, in some situations, home user 18 can request access to an application associated with foreign operator 24 (and which is not hosted by home operator 16) by communicating the request to access request module 42 of home operator 16, which forwards the request to access request module 42 of foreign operator 24, which forwards the request to either access determination module 78 or foreign user 26 for a determination of whether to approve access to the application.

Moreover, after a user's request for access to an application associated with another trading network is approved, the user can access and/or use the application without having to subscribe to or maintain sign-on or login information for the other trading network, since this information is shared and maintained by the operators of the trading networks. For example, in some situations, home user 18 can access a desired application 70 hosted by foreign trading network 14 without subscribing to or maintaining login information for foreign trading network 14, since the registration information 56 associated with desired application 70 is provided to home operator 16 by access establishment module 82 of foreign operator 24.

In addition, users may obtain extended reach and access to subscribed users and applications of other trading networks. Thus, a particular user's home operator (in other words, the operator of the trading network to which the user is subscribed) may provide a "one-stop shop" providing the user with seamless access to applications of many trading networks. Also, unit costs for each user may be reduced due to the shared use of underlying infrastructure associated with some embodiments of the present invention.

In addition, the various modules and databases discussed above provide a number of advantages to operators of electronic trading networks, such as home operator 16 and foreign operator 24. First, an operator of a trading network may provide its subscribed users with extended reach to subscribed users and applications of other trading networks. This may strengthen the relationship between the operator and its subscribed users, and increase the attractiveness for potential subscribers to join the trading network. These advantages may result in increased revenues to the operator of the trading network.

Further, pricing for and revenue generated by transactions between trading networks may be handled in a variety of ways. For example, particular trading networks may share revenue generated by transactions between the particular trading networks. As another example, users may be charged a higher price for transactions between trading networks (inter-network transactions) than for transactions within their respective trading network (intra-network transactions), or users may pay a flat fee for all transactions, whether intra-network or inter-network.

In addition, communications sent from and received by home user 18 and foreign user 26 may appear seamless and transparent. In other words, home user 18 and foreign user 26 may be unaware of the detailed operations of home operator 16 and foreign operator 24 that enable and facilitate the communications. In addition, home user 18 and foreign user 26 need not obtain or maintain the location or address information for the other user (or the other user's operator); instead, home operator 16 and/or foreign operator 24 may maintain this location or address information and manage the appropriate routing of communications accordingly.

FIG. 3 illustrates an example method for establishing an interconnection between trading networks. At step 200, an approval for establishing access to desired application 70 is obtained. Generally, home user 18 selects an application that it wishes to access and makes an access request to access the application, the access request is communicated from home operator 16 to foreign operator 24, a determination to accept or deny the access request is made by foreign operator 24 or foreign user 26, and the result of the determination is communicated to home operator 16 and/or home user 18. Step 200 is described in greater detail below with reference to FIG. 4.

If the access request is approved by foreign operator 24 or foreign user 26 at step 200, access to desired application 70 is established at step 202. Generally, establishing access to desired application 70 may include communicating home user security profile 92 associated with home user 18 from home operator 16 to foreign operator 24, updating home user profile database 88, communicating registration information 56 associated with desired application 70 from foreign operator 24 to home operator 16, and updating the contents of at least one data storage locations 52. Step 202 may also include updating display 98, such as a dashboard display, accessible to home user 18 based on the communicated registration information 56. Step 202 is described in greater detail below with reference to FIG. 5.

At step 204, desired application 70 is accessed and used by home user 18 to complete at least a portion of a business transaction. Step 204 may include communicating home user transaction communication 106 from home user 18 to desired application 70. Communicating home user transaction communication 106 from home user 18 to desired application 70 may or may not include communicating home user transaction communication 106 to or from home operator 16. Step 204 may include a variety of sub-steps in different embodiments of the present invention, as described in more detail with reference to FIGS. 6, 7, and 8.

It should be understood that in some situations in which desired application 70 is a connectivity application, such as an email application, the method of FIG. 3 may allow home user 18 to communicate with foreign user 26. In such a situation, home user 18 obtains an approval at step 200 to establish access to the desired connectivity application in order to communicate with foreign user 26. At step 202, access to the connectivity application is established. At step 204, home user 18 sends a communication, such as home user transaction communication 106, to foreign user 26 via the connectivity application. In this manner, the method described in FIG. 3, as well as appropriate methods described in FIGS. 4 through 8, may be used to allow users between different trading networks (such as home user 18 and foreign user 26) to communicate with each other via connectivity applications such as email, for example. Thus, it should be understood that portions of the description of FIGS. 3 through 8 below concerning, for example, establishing access to, selecting, or communicating with an application, may inherently include establishing access to, selecting, or communicating with a user of a foreign trading network via a connectivity application, even when not explicitly stated.

FIG. 4 illustrates an example method for obtaining an approval to establish access to desired application 70. The method of FIG. 3 is a detailed description of step 200 of FIG. 3. At step 210, an access establishment request is communicated from home user 18 to home operator 16 via network 22. As discussed above with reference to FIG. 2, the access establishment request may include a request to establish access to desired application 70. The access establishment request may be received from home user 18 by access request module 42 of home operator 16.

Home user 18 may discover applications for which to request access in various ways. For example, home user 18 may use a directory of applications available to trading network system 10, such as tile Universal, Description, Discovery and Integration (UDDI) directory. As another example, home trading network 12 may provide home user 18 with a list of foreign services known to home trading network 12.

After the access establishment request is received at home operator 16, the entity that will make the access determination is determined at step 212. In particular, it is determined whether the access determination is to be made by foreign operator 24 or foreign user 26. In some embodiments, foreign operator 24 determines whether the access determination is to be made by foreign operator 24 or foreign user 26 based on whether desired application 70 is hosted by foreign operator 24 or foreign user 26.

If it is determined that the access determination is to be made by foreign user 26, the access establishment request is communicated from home operator 16 to foreign operator 24 via network 22 at step 214. In particular, the access establishment request may be communicated by access request module 42 of home operator 16 to access request module 76 of foreign operator 24.

At step 216, the access establishment request is communicated from foreign operator 24 to foreign user 26 via network 22. In particular, the access establishment request may be communicated to foreign user 26 by access determination routing module 80 of foreign operator 24.

After receiving the access establishment request, foreign user 26 makes an access determination of whether to approve or deny the access establishment request at step 218. The access determination is communicated from foreign user 26 to foreign operator 24 via network 22 at step 220. The access determination received from foreign user 26 by access determination routing module 80.

Alternatively, if it is determined at step 212 that the access determination is to be made by foreign operator 24, foreign operator 24 makes the access determination of whether to approve or deny the access establishment request at step 222. In particular, the access determination may be made by access determination module 78 of foreign operator 24.

Whether the access determination was made by foreign user 26 or foreign operator 24, the result of the access determination is communicated from foreign operator 24 to home operator 16 via network 22 at step 224. In particular, the result of the access determination may be communicated from access determination routing module 80 of foreign operator 24 to access determination routing module 44 of home operator 16.

As discussed above with reference to FIG. 2, the process of obtaining approval of the access establishment request, such as described above with reference to FIG. 4, may be seamless and transparent to home user 18 after home user 18 initiates the access establishment request.

If the result of the access determination is an approval, an application access may be established allowing home user 18 to access and/or use desired application 70. The establishment of access to desired application 70 is described in greater detail below with reference to FIG. 5.

FIG. 5 illustrates an example method of establishing an application access allowing home user 18 to access and/or use desired application 70. The method of FIG. 5 is a detailed description of step 202 of FIG. 3. The application access is established if the result of the access determination received from foreign operator 24 is an approval. At step 230, home user security profile 92 is communicated from home operator 16 to foreign operator 24 via network 22. In particular, home user security profile 92 is communicated from access establishment module 46 of home operator 16 to access establishment module 82 of foreign operator 24. Alternatively, home user profile 55 may be communicated from home operator 16 to foreign operator 24 at step 230. At step 232, home user profile database 88 is updated based on home user profile 55 or home user security profile 92 received by access establishment module 82.

At step 234, registration information 56 is communicated from foreign operator 24 to home operator 16 via network 22. In particular, registration information 56 may be communicated from access establishment module 82 of foreign operator 24 to access establishment module 46 of home operator 16. At step 236, the contents of at least one data storage location 52 is updated based on registration information 56 received by access establishment module 46.

At step 238, application identifiers 100, including desired application identifier 105 associated with desired application 70, are displayed or otherwise indicated to home user 18 such that home user 18 may view and select an application identifier 100 in order to access and/or use the application associated with the selected application identifier 100. In some embodiments, step 238 further includes creating desired application identifier 105 and/or making desired application identifier 105 available to be displayed to home user 18.

As discussed above with reference to FIG. 2, establishment of the application access, such as described above with reference to FIG. 5, may be seamless and transparent to home user 18.

Figure 6:
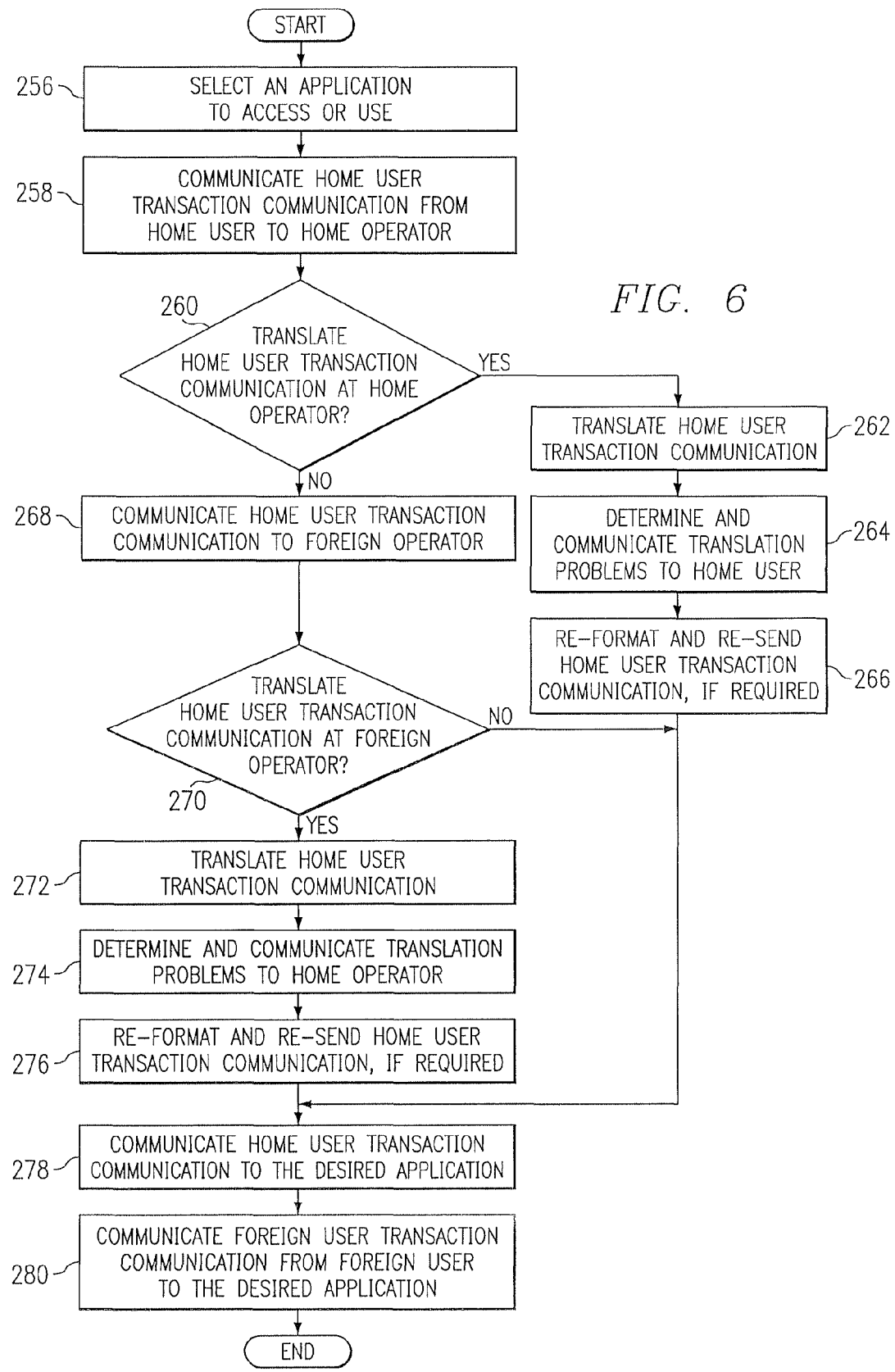
FIG. 6 illustrates an example method of interaction between a home trading network and a foreign trading network.

FIG. 6 illustrates an example method of interaction between home trading network 12 and foreign trading network 14. FIG. 6 generally illustrates home user 18 accessing and communicating a home user transaction communication 106 to a desired application 70 associated with foreign trading network 14. The home user transaction communication 106 may or may not be translated, as discussed below in greater detail.

After an approval for establishing access to desired application 70 is obtained, such as described with reference to FIG. 4, and after an application access to desired application 70 is established, such as described with reference to FIG. 5, home user 18 selects at step 256 an application identifier 100 associated with an application that home user 18 wishes to access or use. In one embodiment, home user 18 may view a listing of one or more application identifiers 100 displayed by display 98, and select desired application identifier 105 from display 98 using an input device associated with computer system 30. In some embodiments, if home user 18 wishes to communicate with foreign user 26, home user 18 selects an application identifier 100 that represents an established access for communicating with foreign user 26 via a desired connectivity application 70. In some situations, home user 18 may select such an application identifier 100 without requesting or having knowledge of the particular connectivity application that provides access to communicate with foreign user 26.

At step 258, a home user transaction communication 106 intended for desired application 70 is communicated from home user 18 to home operator 16 via network 22. In particular, home user transaction communication 106 may be received from home user 18 by transaction communication routing module 48.

At step 260, it is determined whether home user transaction communication 106 is to be translated by translation module 60 of home operator 16. This determination may be made by translation module 60, such as described above with reference to FIG. 2. In particular, translation module 60 may receive home user transaction communication 106 from transaction communication routing module 48 and determine whether to translate home user transaction communication 106. In one embodiment, translation module 60 may determine whether to translate transaction content 108 of home user transaction communication 106 based on a comparison of transaction format 110 and preferred data format 96. If transaction format 110 and preferred data format 96 are the same according to this comparison, a determination is made not to translate home user transaction communication 106. Alternatively, if transaction format 110 and preferred data format 96 are not the same according to the comparison, a determination is made to translate home user transaction communication 106.

If it is determined at step 260 that home user transaction communication 106 is to be translated by translation module 60, home user transaction communication 106 is translated at step 262. In particular, home user transaction communication 106 may be translated by translation module 60 to have a format identical or substantially similar to preferred data format 96.

Translation problems associated with the translation of home user transaction communication 106 are determined and communicated to home user 18, if applicable, at step 264. In particular, translation problems may be determined by translation module 60 and communicated to home user 18. If translation problems were communicated to home user 18 at step 264, home user transaction communication 106 may be re-formatted and re-sent to home operator 16 by home user 18 at step 266.

Alternatively, if it is determined at step 260 that home user transaction communication 106 is not to be translated by translation module 60, home user transaction communication 106 is communicated to foreign operator at step 268. In particular, home user transaction communication 106 may be communicated from transaction communication routing module 48 of home operator 16 to transaction communication routing module 84 of foreign operator 24.

In other situations, home user transaction communication 106 is communicated from home user 18 to foreign operator 24 without being communicated to or from home operator 16, such as indicated by the path of arrow 122. For example, where desired application 70 is a web-based application accessible through the Internet, home user 18 may be able to communicate home user transaction communication 106 directly (for example, without being communicated to or from home operator 16) to foreign operator 24. It should be understood that in such situations, steps 258 through 266 are not performed.

At step 270, it is determined whether home user transaction communication may be made by translation module 86, such as described above with reference to FIG. 2. In particular, translation module 86 may receive home user transaction communication 106 from transaction communication routing module 84 and determine whether to translate home user transaction communication 106. Like translation module 60 of home operator 16, translation module 86 may determine whether to translate transaction content 108 of home user transaction communication 106 based on a comparison of transaction format 110 and preferred data format 96. In some embodiments, communications between home trading network 12 and foreign trading network 14 which require translation are generally translated by one or the other, but not both, of translation module 60 or translation module 86.

If it is determined at step 270 that home user transaction communication 106 is to be translated by translation module 86, home user transaction communication 106 is translated at step 272. In particular, home user transaction communication 106 may be translated by translation module 86 to have a format identical or substantially similar to preferred data format 96.

Translation problems associated with the translation of home user transaction communication 106 are determined and communicated to home operator 16, if applicable, at step 274. In particular, translation problems may be determined and communicated to home operator 16 by translation module 86. The translation problems may be further communicated from home operator 16 to home user 18. Alternatively, the translation problems may be communicated by translation module 86 to home user 18 without communicating the translation problems to or from home operator 16, such as indicated by the path of arrow 122. If translation problems were communicated to home operator 16 or home user 18 at step 274, home user transaction communication 106 may be re-formatted and re-sent to foreign operator 24 by home operator 16 or home user 18 at step 276.

Whether or not translated (by translation module 60 at step 262 and/or by translation module 86 at step 272), home user transaction communication 106 is communicated to desired application 70 at step 278. If desired application 70 is hosted by foreign user 26, home user transaction communication 106 may be communication to desired application 70. The methods described above allow home user 18 to transmit home user transaction communication 106 to foreign user 26 in order to complete at least a portion of a business transaction. For example, home user transaction communication 106 may be an offer to buy five widgets, and the methods described above allow home user 18 to communicate the offer to foreign user 26.

If desired application 70 is a connectivity application, such as an email application, for example, transaction communication routing module 84 may provide the connectivity application with necessary information for communicating with foreign user 26 (for example, the destination information and preferred communication protocol of foreign user 26). In particular, transaction communication routing module 84 may obtain this information from foreign user profile 94 associated with foreign user 26.

In addition, a foreign user transaction communication 120 is communication from foreign user 26 to desired application 70 at step 280. If desired application 70 is hosted by foreign operator 24, foreign user transaction communication 120 may be communicated to desired application 70 via network 22. As discussed above with reference to FIG. 2, foreign user transaction communication 120 may relate to the same business transaction as home user transaction communication 106, and may be made in response to home user transaction communication 106 initiated by home user 18.

FIG. 7 illustrates another example method of interaction between home trading network 12 and foreign trading network 14. FIG. 7 generally illustrates a method of home user 18 and foreign user 26 collaboratively using a desired application 70 associated with foreign trading network 14. The home user transaction communication 106 may or may not be translated, as discussed below in greater detail.

After an approval for establishing access to desired application 70 is obtained, such as described with reference to FIG. 4, and after an application access to desired application 70 is established, such as described with reference to FIG. 5, home user 18 selects at step 304 an application identifier 100 associated with an application that home user 18 wishes to access and/or use, such as described with reference to step 256 of FIG. 6. In particular, home user 18 may select desired application identifier 105 in order to access and/or use desired application 70.

At step 306, home user transaction communication 106 is communicated from home user 18 to desired application 70, such as by using one or more of the methods described in steps 258 through 278 of FIG. 6. In particular, in some situations, step 306 includes determining whether to translate, and translating, home user transaction communication 106 before home user transaction communication 106 is communicated to desired application, such as by using one or more of the methods described in steps 260 through 266, or steps 270 through 276, of FIG. 6.

At step 308, foreign user transaction communication 120 is communicated from foreign user 26 to desired application 70, such as described with reference to step 280 of FIG. 6. Steps 306 and 308 may be repeated as home user 18 and foreign user 26 communicate other transaction communications to desired application 70. In this manner, home user 18 and foreign user 26 may use desired application 70 collaboratively at steps 306 and 308 in order to complete at least a portion of a business transaction. For example, home user 18 may communicate a document to desired application 70, and foreign user 26 may make changes to the document on desired application 70. As another example, in an embodiment in which desired application 70 is a web-based application, home user 18 and foreign user 26 may collaboratively use desired application 70 by communicating information to the web page via one or more web browsers.

At step 310, a foreign user notification regarding the use of desired application 70 at steps 306 and/or 308 is communicated from desired application 70 to foreign user 26. For example, foreign user 26 may be notified, for example by email, of each time home user 18 access or uses desired application 70, each time an action is taken by either user 18 or 26, and of changes in the status of the transaction. For instance, an action taken by either user 18 or 26 outside of a pre-determined time window for the action may trigger a notification. Notifications may also be generated in such circumstances as, for example, an inventory stock-out, a mismatch between a forecast and a committed quantity of goods, a shipment delay, or an order cancellation.

The foreign user notification may include information such as, for example, parameters identifying or describing the transaction, the users and the application involved, the event causing the notification (such as one of the users accessing the application), and the time of the event. In one embodiment, a notification may include a user identification of foreign user 26 and/or home user 18, an identification of desired application 70, a time stamp and return status of foreign user 26 or home user 18, and other relevant parameters in a particular format. For example, the foreign user notification may have a format similar to a URL or web address, such as: <Parameter 1>.<Parameter 2>.<Parameter 3>.

Similarly, a home user notification regarding the use of desired application 70, which may be similar to the foreign user notification in content and form, is communicated from desired application 70 to home operator 16 at step 312. At step 314, the home user notification is communicated from home operator 16 to home user 18. As discussed above with reference to FIG. 2, home user notification data 58 may include a preferred notification mode (for example, email) associated with home user 18, and notification module 50 may communicate the home user notification to home user 18 according to the preferred notification mode.

FIG. 8 illustrates another example method of interaction between home trading network 12 and foreign trading network 14. FIG. 8 generally illustrates a method of a home operator application 40 communicating with desired application 70 associated with foreign operator 24. The communications between home operator application 40 and desired application 70 may or may not be translated, as discussed below in greater detail.

After an approval for establishing access to desired application 70 is obtained, such as described with reference to FIG. 4, and after an application access to desired application 70 is established, such as described with reference to FIG. 5, home user 18 or home operator 16 selects at step 324 an application identifier 100 associated with an application that home user 18 wishes to access or use, such as described with reference to step 256 of FIG. 6. In particular, home user 18 or home operator 16 may select desired application identifier 105 in order to access and/or use desired application 70.

At step 326, a home application transaction communication 112 is communicated from a particular home operator application 40 to foreign operator 24 via network 22 (see FIG. 1). In particular, home application transaction communication 112 may be communicated to transaction communication routing module 82 of foreign operator 24.

Home application transaction communication 112 is translated at step 328, if appropriate, such as using the methods described above with reference to FIGS. 2 and 6. In some situations, home application transaction communication 112 is translated by translation module 86 of foreign operator 24. In other situations, home application transaction communication 112 is translated by translation module 60 of home operator 16 before being communicated to transaction communication routing module 82 of foreign operator 24. Whether or not translated (by translation module 60 and/or translation module 86), home application transaction communication 112 is communicated to desired application 70 at step 330. In particular, home application transaction communication 112 may be communicated to desired application 70 by transaction communication routing module 84.

A foreign application transaction communication 118 is communicated from desired application 70 to home operator 16 via network 22 at step 332. In particular, foreign application transaction communication 118 may be communicated to transaction communication routing module 48 of home operator 16.

At step 334, foreign application transaction communication 118 is translated, if appropriate, by a translation module of home operator 16 (not expressly shown), such as described above with reference to FIG. 2. Whether or not translated, foreign application transaction communication 118 is communicated to the particular home operator application 40 at step 336. In particular, foreign application transaction communication 118 may be communicated to the particular home operator application 40 by transaction communication routing module 48.

Thus, according to the methods described above with reference to FIG. 8, home operator applications 40 and foreign operator applications 68 may communicate with each other. As discussed above with reference to FIG. 2, these communications may be seamless and transparent to home user 18 and foreign user 26.

It should be understood that the methods described above in FIGS. 3 through 8 are merely examples, and may be performed using more, less, or different steps. In addition, the steps may be performed in a different order, and particular steps may occur simultaneously. For example, if the access establishment request is approved as described with reference to FIG. 4, foreign operator 24 may communicate the result of the access determination (step 224 of FIG. 4) and the registration information 56 (step 234 of FIG. 5) to home operator 16 simultaneously.

The various methods discussed above with reference to FIGS. 3 through 8 may provide a number of advantages to users subscribed to electronic trading networks. For example, a user subscribed to one trading network (for example, user 18 subscribed to home trading network 12) can access and/or use applications of other trading networks (for example, desired application 70 of foreign trading network 14) which may not otherwise be available to the user. In particular, the user can access and/or use applications of other trading networks without having to subscribe to or maintain sign-on or login information for each of these other trading networks. In addition, users may obtain extended reach and access to subscribed users and applications of other trading networks. Thus, a particular user's home operator (in other words, the operator of the trading network to which the user is subscribed) may provide a "one-stop shop" providing the user with seamless access to applications of many trading networks. Also, unit costs for each user may be reduced due to the shared use of underlying infrastructure associated with some embodiments of the present invention.

In addition, various methods discussed above with reference to FIGS. 3 through 8 may provide a number of advantages to operators of electronic trading networks, such as home operator 16 and foreign operator 24. First, an operator of a trading network may provide its subscribed users with extended reach to subscribed users and applications of other trading networks. This may strengthen the relationship, between the operator and its subscribed users, and increase the attractiveness for potential subscribers to join the trading network. These advantages may result in increased revenues to the operator of the trading network.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A non-transitory computer-readable medium storing software thereon, the software when executed by a home operator processor causing the home operator processor to perform steps comprising:
   receiving an access establishment request communicated over a computer network from a home user subscribed to a home trading network and not subscribed to a foreign trading network, the access establishment request including a request to access a desired application, the desired application associated with the foreign trading network and otherwise only accessible to subscribers of the foreign trading network, the foreign trading network coupled with the home trading network via the computer network;
   communicating the access establishment request over the computer network to a foreign operator processor of the foreign trading network;
   receiving an approval of the access establishment request communicated over the computer network from the foreign operator processor;
   communicating over the computer network a home user profile comprising subscriber information to establish an application access on a home access establishment module and a foreign access establishment module, the application access allowing the home user to use the desired application without subscribing to the foreign trading network, the subscriber information including at least one application associated with the home user profile;
   communicating a transaction communication over the computer network to a translation module;
   comparing a transaction format of the transaction communication and a preferred data format for the desired application to determine whether to translate the transaction communication;
   communicating the transaction communication over the computer network to the desired application, wherein the transaction communication is related to a business transaction and the translation module determines problems associated with translating the transaction communication; and
   responsive to the determination of whether to translate the transaction communication, translating the transaction communication.

2. The computer-readable medium of claim 1, wherein the desired application is hosted by the foreign operator processor.

3. The computer-readable medium of claim 1, wherein the desired application is hosted by a foreign user.

4. The computer-readable medium of claim 1, wherein the software further causes the home operator processor to:
   receive registration information communicated over the computer network from the foreign operator processor, the registration information including registration information associated with the desired application; and
   automatically update an application registration database based on the received registration information.

5. The computer-readable medium of claim 1, wherein the software further causes the home operator processor to:
   automatically update an application identifier set comprising one or more application identifiers, each application identifier associated with a particular application and selected by the home user in order to access the particular application; and include in the application identifier set a desired application identifier associated with the desired application.

6. The computer-readable medium of claim 1, wherein:
   the foreign trading network comprises a foreign user; and
   the desired application is hosted by the foreign operator processor and used collaboratively by the foreign user and the home user to complete at least a portion of the business transaction.

7. The computer-readable medium of claim 6, wherein the software further causes the home operator processor to receive a notification from the desired application and communicate the notification to the home user.

8. A non-transitory computer-readable medium storing software thereon, the software when executed by a foreign operator processor causing the foreign operator processor to perform steps comprising:
   receiving an access establishment request communicated over a computer network from a home operator processor of a home trading network coupled with a foreign trading network via the computer network, the access establishment request initiated by a home user subscribed to the home trading network and not subscribed to the foreign trading network, the access establishment request including a request to access a desired application associated with the foreign trading network and otherwise only accessible to subscribers of the foreign trading network;

communicating an approval of the access establishment request over the computer network to the home operator processor;

receiving a home user profile comprising subscriber information to establish an application access on a home access establishment module and a foreign access establishment module, the application access allowing the home user to use the desired application without subscribing to the foreign trading network, the subscriber information including at least one application associated with the home user profile;

establishing the application access allowing the home user to use the desired application;

receiving a transaction communication communicated over the computer network from a translation module in the home trading network, the translation module compares a transaction format of the transaction communication and a preferred data format for the desired application to determine whether to translate the transaction communication, wherein the transaction communication is related to a business transaction and the translation module determines problems associated with translating the transaction communication;

communicating the transaction communication over the computer network to the desired application; and responsive to the determination of whether to translate the transaction communication, translating the transaction communication.

9. The computer-readable medium of claim 8, wherein the desired application is hosted by the foreign operator processor.

10. The computer-readable medium of claim 8, wherein:
the desired application is associated with the foreign operator processor; and
the software further causes the foreign operator processor to determine whether to approve or deny the access establishment request.

11. The computer-readable medium of claim 8, wherein the software further causes the foreign operator processor to receive the transaction communication from the home operator processor.

12. The computer-readable medium of claim 8, wherein the software further causes the foreign operator processor to receive the transaction communication over the computer network from the home user without being communicated by the home operator processor.

13. The computer-readable medium of claim 8, wherein the software further causes the foreign operator processor to:
automatically update a profile database associated with the foreign operator processor based on the received home user profile; and
communicate registration information associated with the desired application over the computer network from the foreign operator processor to the home operator processor to update registration database associated with the home operator processor based on the communicated registration information.

14. The computer-readable medium of claim 8, wherein:
the desired application is associated with a foreign user of the foreign trading network;
the foreign operator processor maintains a foreign user profile associated with the foreign user, the foreign user profile including a preferred format associated with the desired application; and
the software further causes the foreign operator processor to translate the transaction communication based on the preferred format.

15. The computer-readable medium of claim 14, wherein the software further causes the foreign operator processor to translate the transaction communication before being communicated over the computer network to the desired application.

16. The computer-readable medium of claim 8, wherein the software further causes the foreign operator processor to receive a transaction communication communicated over the computer network from a home application associated with the home user and hosted by the home operator processor.

17. The computer-readable medium of claim 8, wherein:
the foreign trading network comprises a foreign user; and
the desired application is used collaboratively by the foreign user and the home user to at least partially complete the business transaction.

* * * * *